(No Model.)
E. N. DICKERSON.
PROCESS OF AND APPARATUS FOR PRODUCING METALLIC COMPOUNDS BY ELECTRICITY.
No. 557,057. Patented Mar. 24, 1896.
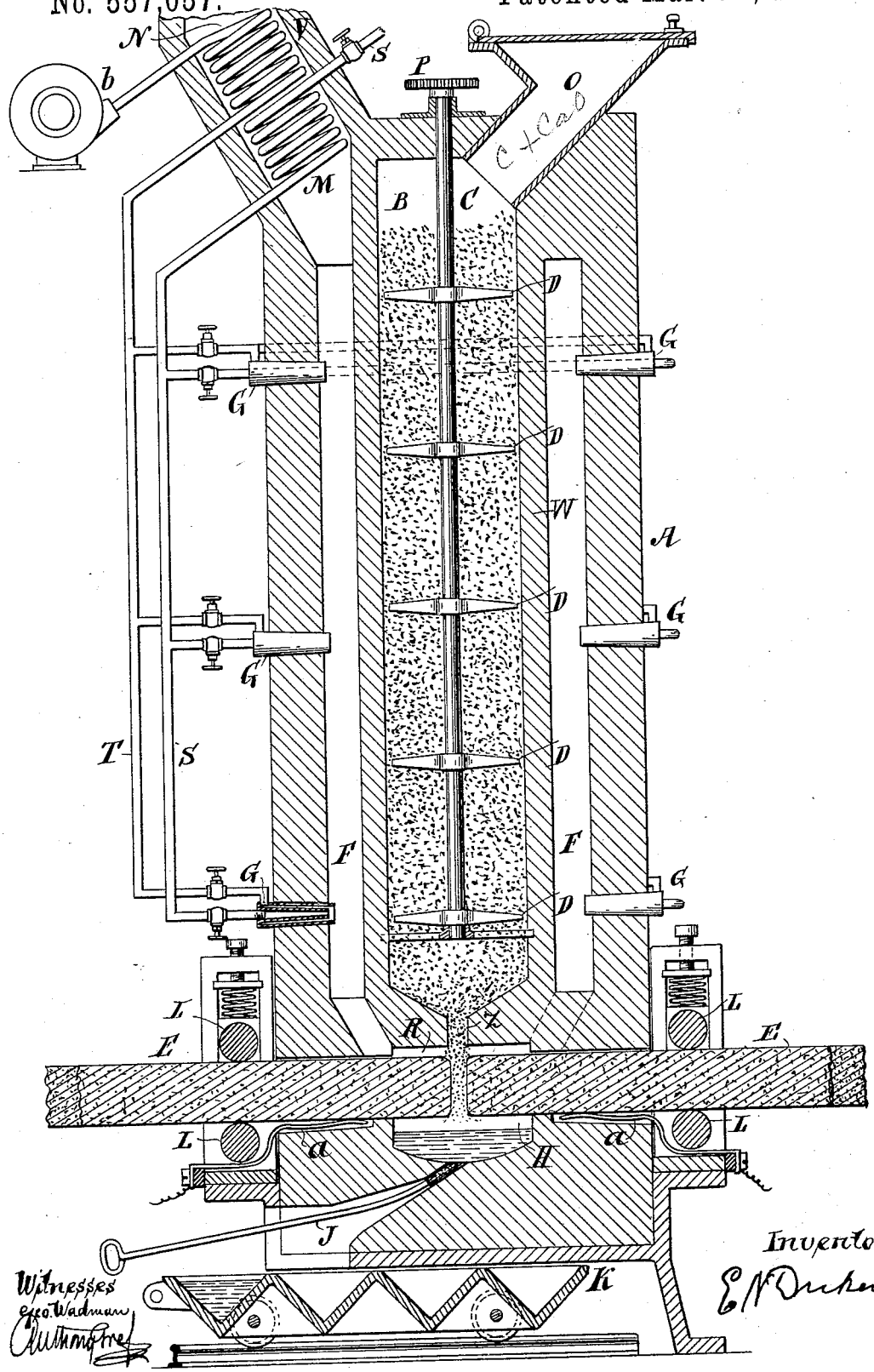

UNITED STATES PATENT OFFICE.

EDWARD N. DICKERSON, OF NEW YORK, N. Y.

PROCESS OF AND APPARATUS FOR PRODUCING METALLIC COMPOUNDS BY ELECTRICITY.

SPECIFICATION forming part of Letters Patent No. 557,057, dated March 24, 1896.

Application filed June 5, 1895. Serial No. 551,784. (No model.)

*To all whom it may concern:*

Be it known that I, EDWARD N. DICKERSON, a citizen of the United States, and a resident of the city, county, and State of New York, have invented a certain new and useful Improvement in Processes of and Apparatus for the Production of Metallic Compounds by Electricity, of which the following is a specification.

This invention relates to an improved process and apparatus for carrying the same into effect for the production of metallic compounds by means of the action of the electric current, and is especially applicable to the production of carbides—as, for instance, calcic carbide by the union of calcium oxide and carbon—and I will therefore describe my process and apparatus with special reference to this production.

At the present time calcic carbide is produced according to the process of Thomas L. Willson, of which process this is a modification, by heating together in the electric arc calcium oxide and carbon finely divided, the carbon being in excess. In that process the heating of the carbon and calcium oxide is exclusively accomplished by the heat of the electric arc. During the process of combination the oxygen of the calcium oxide is driven off and unites with the excess of carbon, producing carbon monoxide. This is a combustible gas, and the purpose of my present invention is in the first place to preliminarily heat the mixture to be converted before it comes to the point of the electric arc, and utilize as a means of this heating the carbon monoxide produced by the decomposition of the material itself; also by my process the operation is carried on with the practical exclusion of air, which has a tendency in the open furnace to again convert the calcium into calcium oxide. By my process, likewise, the calcic carbide when formed is not further subjected to the heat of the arc for a considerable period of time, as is the case in the Willson furnace.

My invention will be readily understood from the accompanying drawing, which is generally a vertical cross-section of my improved furnace.

A represents the external vertical walls of the furnace, which, as shown, is circular in section. Within the external wall is the interior wall W with an intermediate chamber F. The mixed carbon and lime are placed into the interior chamber through the closed hopper O, where the mixture is shown at B, extending vertically in the inner chamber. In this chamber, suitably supported, are agitators or stirrers D, which may be driven by gear P. The lower end of the interior chamber is preferably conical in shape, so as to guide the material into the narrow channel or throat Z, arranged to be immediately above the carbons E E. These carbons are fed in by suitable mechanism, now well known, which may be automatic or may be arranged by hand, depending upon the number of ampères of current which it is desirable to pass through the carbons E, which, of course, are made as wide as the throat Z. Above the carbons is the chamber R.

The carbon monoxide generated by the passage of the current escapes by the chamber R and through suitable openings into the chamber F. The carbon monoxide is of course very hot, and its heat is at first as great or greater than its own heat of combustion, and it is used to heat the incoming mixture before itself is burned with added air, as will be hereinafter described. The liquefied calcic carbide falls into the lower chamber H and is thence withdrawn by the plug J, whereby it may be caused to fall into the mold-carriage K.

A suitable flux is in some cases desirable to be added to the calcic carbide to produce greater fluidity. This depends upon the distance the melted calcic carbide has to flow.

The carbons should fit practically air-tight through the exterior casing, and the current can be carried in by rollers L in metallic contact with the poles of the dynamo, which may be aided by springs $a$, which when necessary may be made of platinum, carrying the current as near as possible to the point of utilization.

The carbon monoxide passing upward to the chamber F meets the tuyeres G, through which air may be forced by means of the pipe T. The said air may be delivered from blowers $b$ through coil N in the uptake V of the furnace. An additional amount of combustible gas may be supplied by the pipe S to be heated in coil M, also in the uptake, and this additional gas may be burned in the chamber F with the incoming air, so as to increase the heating effect of the carbon monoxide delivered at the base of the apparatus.

What I claim as my invention, and desire to secure by Letters Patent, is—

1. The process of producing calcic carbide, which consists in feeding into the interspace between two electric poles a finely-divided mixture of calcic oxide and carbon, in decomposing the said calcic oxide and carbon by the electric current, thereby producing calcium carbide and carbon monoxide, and in utilizing said carbon monoxide to heat the mixture in its progress to the point of decomposition by burning the same with added air so as to heat the said mixture, substantially as described.

2. The combination, in an electric furnace, of an interior chamber through which lime and carbon may be fed, an exterior heating-chamber surrounding the same, two carbon poles connected with the dynamo for effecting the conversion of the materials into calcic carbide, located at the foot of the interior chamber, and the connection from the chamber in which said poles are located to the chamber surrounding the feeding-in chamber, substantially as described.

In testimony whereof I have signed my name to this specification in the presence of two subscribing witnesses.

E. N. DICKERSON.

Witnesses:
ANTHONY GREF,
HARRY COUTANT.